Nov. 5, 1935.  E. B. GELLATLY  2,019,961
CONVEYING MECHANISM
Filed March 16, 1932   2 Sheets-Sheet 1

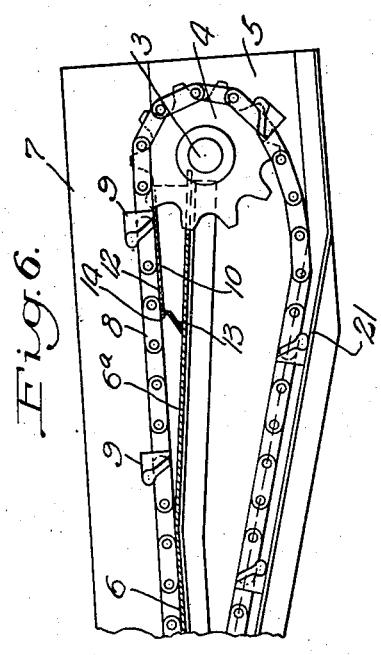
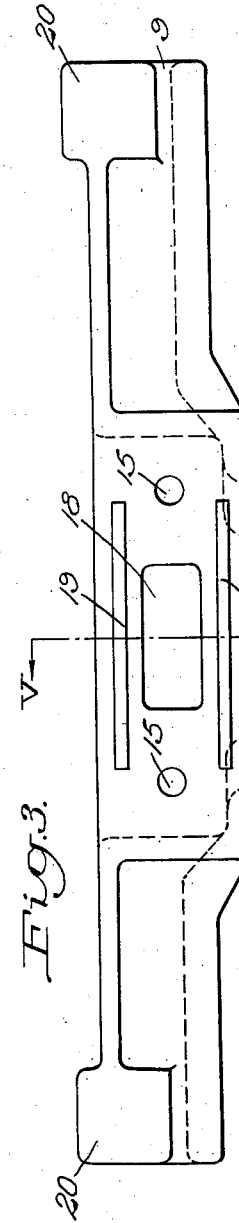
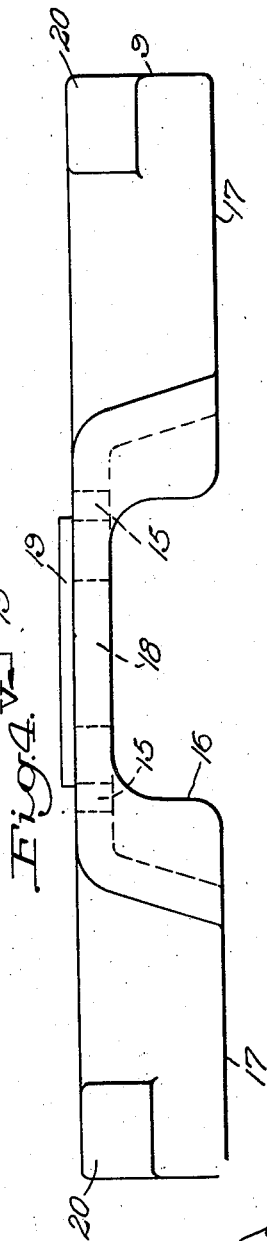
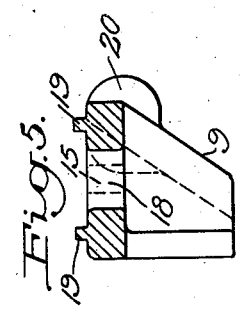

Patented Nov. 5, 1935

2,019,961

UNITED STATES PATENT OFFICE 2,019,961

CONVEYING MECHANISM

Edwin B. Gellatly, Pittsburgh, Pa.

Application March 16, 1932, Serial No. 599,079

18 Claims. (Cl. 198—168)

This invention relates to conveying mechanism, and more particularly to conveying mechanism for use in conveying loose or lumpy materials such as coal, earth, shale, etc. The invention further relates to conveying mechanism having means for preventing interference with operation of the conveying mechanism by material being conveyed thereby, and still further to certain constructional features enabling improved operation of conveyors.

Although not so limited in its broader aspects, the invention is particularly well adapted for application to what are commonly known as flight conveyors, and for purposes of illustration will be described as embodied in a flight conveyor of the endless type. Provision is made for preventing clogging of the conveying mechanism by lumps or pieces of material which might become wedged between certain of the parts of the mechanism during operation and freeing the conveying element and driving mechanism to insure substantially uninterrupted operation without damage to the parts. Provision is also made for assisting in proper return movement of the conveying element in a conveyor of the endless type.

Other objects and advantages of the invention will become apparent as the following description of a present preferred embodiment thereof proceeds.

In the accompanying drawings I have shown a present preferred embodiment of the invention, in which Figure 1 is a partial elevational view of conveying mechanism;

Figure 3 is a top plan view of a conveyor flight;

Figure 4 is a front elevational view of the flight shown in Figure 3;

Figure 5 is a vertical cross-sectional view taken on the line V—V of Figure 3; and Figure 6 is a detail cross-sectional view through a portion of the mechanism shown in Figure 2.

Figure 1:
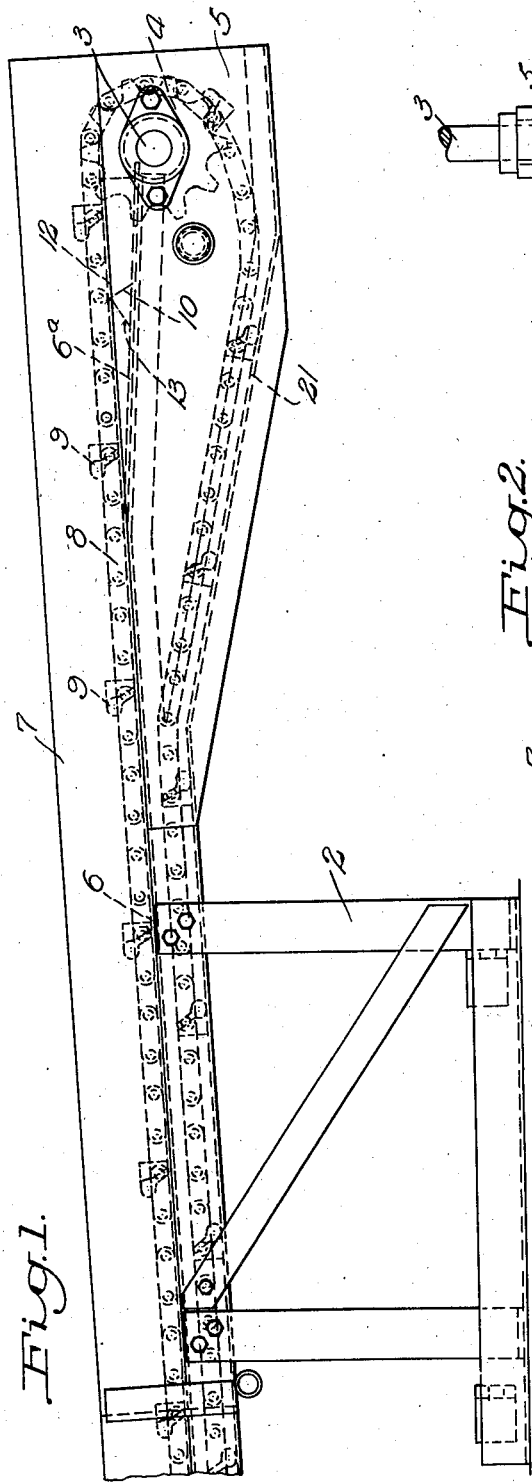

Referring more particularly to the drawings, reference numeral 2 designates generally supporting mechanism upon which is mounted a conveyor of the endless flight type such as is particularly adapted for use in coal mines for conveying coal to the cars which transport it to the surface. The conveying mechanism comprises suitable driving mechanism (not shown) such as an electric motor connected to a drive shaft 3 to which is keyed a driving sprocket 4. The shaft 3 is journaled for rotation in a frame 5 which comprises a floor surface 6 over which the conveying element operates, as will presently be described, and side guards 7 to confine the material in the path of the conveying element. The surface 6 may be a trough, as is commonly employed in conveying devices for preventing lateral loss of material being handled.

Meshing with and adapted to be driven by the sprocket 4 is an endless sprocket chain 8 to which are connected at intervals flights 9 extending transversely of the chain and whose length is only slightly less than the distance between the opposite side guards 7. The chain is adapted to be operated by rotation of the shaft 3 in the clockwise direction, viewing Figures 1 and 6, and the flights during the major portion of their forward travel (i. e. travel toward the right, viewing Figures 1 and 2) lie upon and in contact with the surface 6 so as to effectively advance along such surface material lying thereon.

Figure 2:
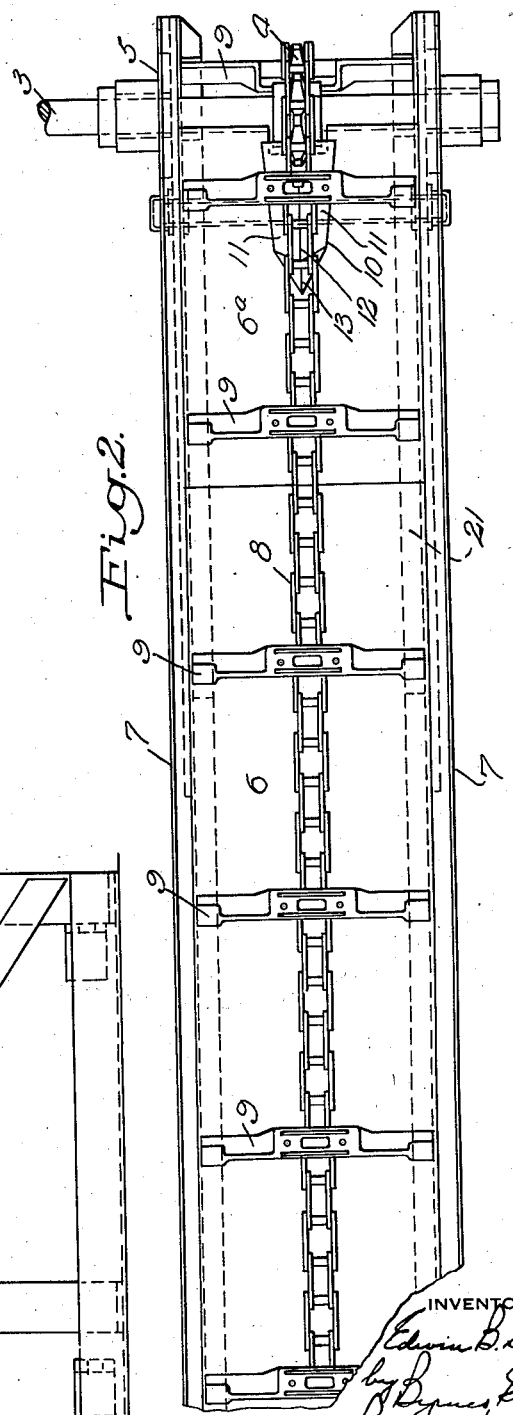
Figure 2 is a partial plan view of the conveying mechanism shown in Figure 1.

Adjacent the discharge end of the conveyor a portion 6a of the surface 6 diverges from the plane of the remaining portion of such surface, extending generally downwardly from such plane, as shown in Figures 1 and 6. The sprocket 4, however, is so proportioned as to draw the upper reach of the chain 8 generally in the same plane as that in which it lies while moving along the principal portion of the surface 6, so that adjacent the point where the portion 6a of the surface diverges from the plane of the remaining portion the upper reach of the chain extends generally at an angle to the plane of the surface portion 6a, becoming spaced therefrom to a substantial extent adjacent the sprocket 4. The portion 6a of the surface terminates adjacent the shaft 3, the material being discharged into a mine car or onto other conveying mechanism.

The space between the chain, and consequently the flights, and the surface 6a at the discharge end of the conveyor prevents jamming of lumps or pieces of material between the flights and the shaft 3 or the end of the surface 6a. There would otherwise be a tendency for material to be caught and crushed between the flights and the end of the conveyor, possibly resulting in damage to the conveyor or bending of the flights. There might also be a tendency for lumps of material which might have gotten caught in the chain to become interposed between the chain and the sprocket, thus possibly causing damage to either or both, putting an additional strain on the machinery and crushing the material about the sprocket. The spacing between the chain and the surface 6a at the discharge end of the conveyor tends to alleviate this condition, although in order to further insure against damage by reason of the interposition of material between the chain and the sprocket a device 10 is provided. Such device extends upwardly from the surface 6a and comprises sloping sides 11 joining at an apex at 12, which apex is substantially in the plane of the principal portion of the surface 6 and parallel to the chain. The device 10 also has a pointed nose 13 which points in the direction from which the material is advanced. The nose 13 has a substantially vertically extending upper portion 14 for a purpose which will presently be described.

The upper reach of the chain 8 is guided by the sprocket 4 substantially above and along the apex 12 of the device 10. The device divides the material being advanced by the conveyor, causing part of it to move to one side and part to the other side of the chain. This further reduces the possibility that material will become interposed between the chain and the sprocket. The nose 13, being substantially sharp, not only tends to deflect material to either side, but also, in the event that a lump of substantial size is disposed more or less centrally under the chain, serves in cooperation with the chain to cut or break up such lump before it can become interposed between the chain and the sprocket. The portion 14 of the nose of the device 10, which portion extends substantially perpendicularly to the chain, serves as a cutting edge, any lumps of material passing by the inclined nose of the device 10 being forced against the portion 14 by the chain, positively insuring breaking up of the lumps and passage of the material to one side or the other of the chain before the chain reaches the sprocket.

Thus the divergence of the movable conveying element and the surface underlying the same tends to prevent the undesirable jamming of lumps of material between portions of the conveying mechanism adjacent its discharge end, and the device 10 aids in separating the material and causing it to pass laterally of the chain and sprocket. The substantially sharp nose of the device 10, and particularly the portion 14, which extends substantially perpendicularly to the chain, insure breaking up of lumps which may have gotten under the chain and which might become interposed between the chain and sprocket.

Each of the flights 9 is provided with holes 15 for the reception of pins cooperating with a pintle of the chain to connect the flight thereto. The central portion of each flight is hollowed at 16 to receive the chain, the lateral portions 17 extending downwardly at either side of the chain and lying in contact with the surface 6. Thus, forward movement of the chain causes corresponding movement of the flights which cooperate with the surface underlying them to advance material toward the discharge end of the conveyor.

In order to permit egress of material which may have gotten into the chain beneath one of the flights, each flight also has a central opening 18 therethrough, which opening is directly above the chain. As the chain passes around the sprocket 4 any material which may have gotten into it beneath the flight is given a means of egress through the opening 18, thus further preventing jamming of the mechanism or damage to the parts.

Each flight 9 is likewise provided across its central portion with upstanding strengthening ribs 19 at opposite sides of the opening 18 to give additional strength to the flight at such portion. In the event of a large lump of material becoming interposed between the flight and a relatively stationary portion of the mechanism there would be a tendency to bend the flight substantially at its central portion, and this tendency is overcome by the provision of the strengthening ribs 19. Each flight also has at its opposite extremities enlarged hub-like bearing portions 20 which are substantially smooth and rounded and which upon return movement of the conveying element are adapted to serve as bearings to carry the weight of the chain and flights, riding upon angle members 21 at opposite sides of the conveyor. Such portions 20 provide an improved bearing for the flights upon their return movement and slide smoothly into contact with the members 21 and also are adapted to withstand considerable wear before replacement of the flights is necessary. Thus the flights themselves are improved in that they provide means of egress for material which might have found its way into the chain beneath the flights, they are provided with strengthening ribs adjacent their central portions where they are subjected to the greatest stress, and they have improved bearing members effective upon return movement of the conveying element.

The flights, instead of being connected to the chain through its pintles, as above described, may be connected to lugs extending outwardly from the sides of the links intermediate the pintles so that the opening 18 in each flight will lie directly opposite an opening in one of the links of the chain. Such an arrangement provides even more effectively for accomplishment of the functions above described, and also readily permits of egress of small particles of coal which may enter the openings in the chain above the flights upon return travel of the conveying element.

While I have shown and described a present preferred embodiment of the invention, it is to be distinctly understood that the same is not limited thereto, but may be otherwise variously embodied within the scope of the following claims.

I claim:

1. Conveying mechanism comprising a movable conveying element having a surface over which the conveying element is adapted to travel and on which material being conveyed is adapted to lie, and means for driving the conveying element, the said means comprising a sprocket and a drive shaft therefor positioned substantially below the plane of travel of the conveying element as the conveying element travels towards the driving means, the said surface having a portion adjacent an end of the conveying mechanism diverging from the conveying element and terminating adjacent and above the drive shaft while the conveying element continues to travel in a substantially horizontal path above the diverging portion of the surface to form a sufficient clearance space between the conveying element and the said diverging portion of the surface to prevent the material being conveyed from entering between the conveying element and driving means.

2. Conveying mechanism comprising a movable conveying element having upper and lower runs, a surface in contact with which the conveying element is adapted to travel throughout a portion of the length of the conveying mechanism and on which material being conveyed is adapted to lie, and means for driving the conveying element including a drive sprocket and drive shaft therefor, the said sprocket and drive shaft being located substantially below the plane of the upper run of the conveyor as the conveyor travels towards the sprocket, the said surface having a portion thereof adjacent one end of the conveying mechanism diverging from the conveying element and terminating adjacent to but above the said drive shaft, and forming between the conveying element and itself a sufficient space to enable the material being conveyed to clear the conveying element and drive sprocket as the conveying element passes over the sprocket.

3. Conveying mechanism comprising a chain conveying element, a trough over which the conveying element is adapted to travel and on which material being conveyed is adapted to lie, the trough and the conveying element diverging adjacent an end of the conveying mechanism to provide a space therebetween at such end, a sprocket meshing with the chain adjacent such space, and a drive shaft for the sprocket, the sprocket and drive shaft being positioned substantially below the plane of the trough, the trough terminating adjacent the drive shaft, the said space affording sufficient clearance for preventing the material being conveyed from entering between the chain and sprocket.

4. Conveying mechanism, comprising a movable conveying element, a surface over which the conveying element is adapted to travel in a conveying movement, the surface and the conveying element diverging adjacent an end of the conveying mechanism, deflecting means extending between the surface and the conveying element at such end and mounted over a portion of the surface, and means for moving the conveying element, the deflecting means deflecting material being conveyed along the surface away from the said means for moving the conveying element.

5. Conveying mechanism, comprising a movable conveying element, a surface over which the conveying element is adapted to travel in a conveying movement, the surface and conveying element diverging adjacent an end of the conveying mechanism, an inclined material dividing member extending from the surface to a position adjacent a portion of the conveying element at such end of the conveying mechanism, and means for moving the conveying element.

6. Conveying mechanism, comprising a chain conveying element, a surface over which the conveying element is adapted to travel in a conveying movement, the surface and conveying element diverging adjacent an end of the conveying mechanism, an inclined material dividing member extending from the surface in contact with the chain at such end of the conveying mechanism, and means for moving the conveying element.

7. Conveying mechanism, comprising a chain conveying element, a surface over which the conveying element is adapted to travel in a conveying movement, the surface and conveying element diverging adjacent an end of the conveying mechanism, an inclined material dividing member extending from the surface in contact with the chain at such end of the conveying mechanism, a sprocket meshing with the chain adjacent such member, and means for moving the conveying element.

8. Conveying mechanism, comprising a chain conveying element, a surface over which the conveying element is adapted to travel in a conveying movement, the surface and conveying element diverging adjacent an end of the conveying mechanism, a material dividing member inclined upwardly to an apex adjacent the chain at such end of the conveying mechanism, a sprocket meshing with the chain adjacent such member, and means for moving the conveying element.

9. Conveying mechanism, comprising a chain conveying element, a surface over which the conveying element is adapted to travel in a conveying movement, the surface and conveying element diverging adjacent an end of the conveying mechanism, a material dividing member having a substantially sharp nose in the path of advancing material at such end of the conveying mechanism, and means for moving the conveying element.

10. Conveying mechanism, comprising a chain conveying element, a surface over which the conveying element is adapted to travel in a conveying movement, the surface and conveying element diverging adjacent an end of the conveying mechanism, a material dividing member having a nose in the path of advancing material and tapering to an apex adjacent the chain at such end of the conveying mechanism, and means for moving the conveying element.

11. Conveying mechanism, comprising a chain conveying element, a surface over which the conveying element is adapted to travel in a conveying movement, the surface and conveying element diverging adjacent an end of the conveying mechanism, a material dividing member having a nose provided with a material cutting edge substantially perpendicular to the chain and tapering to an apex in contact with the under surface of the chain at such end of the conveying mechanism, and means for moving the conveying element.

12. Conveying mechanism comprising a conveying element including a chain having flights connected therewith, a surface over which the conveying element is adapted to travel and on which material being conveyed is adapted to lie, the surface and the conveying element diverging adjacent an end of the conveying mechanism, and a sprocket below the plane of travel of the conveying element and the surface and meshing with the chain adjacent such end of the conveying mechanism, the flights respectively having their central portion of each hollowed to receive the chain and defining material scraping surfaces extending laterally from the chain, the flights also having openings therethrough to permit egress of material whereby to prevent such material from interfering with normal meshing of the chain and sprocket, the said diverging surface terminating adjacent the sprocket but just short thereof.

13. In a conveyor, the combination with a trough having side walls, a material discharge end, and a bottom forming a material supporting surface, of a shaft mounted on the discharge end of said trough and extending between the side walls thereof, a sprocket carried on said shaft intermediate said side walls, a draft chain carried on said sprocket and extending longitudinally of and within said trough, material conveying flights extending laterally of said chain and attached thereto, said shaft being adapted to drive said chain and flights whereby they will move in said trough and convey material longitudinally thereof to said material discharge end, the bottom of said trough having a forward surface adjacent the discharge end and an intermediate surface rearwardly thereof, said surfaces being angularly disposed, said chain being adapted to follow the general plane of said intermediate surface as it passes over the forward surface, said forward surface diverging from the plane of said intermediate surface and from the path of travel of said chain whereby the distance therebetween is progressively increased toward said shaft, said forward surface extending approximately to said shaft and being intersected by said sprocket thereby providing material supporting surfaces on each side of said sprocket, the plane of said forward surface passing above the axis of rotation of said shaft.

14. In a conveyor, the combination with a trough having side walls, a material discharge end, and a bottom forming a material supporting surface, of a shaft mounted on the discharge end of said trough and extending between the side walls thereof, a sprocket carried on said shaft intermediate said side walls, draft and conveying means carried on said sprocket adapted to move material longitudinally of said trough, said shaft being adapted to drive said draft and conveying means to convey material to said discharge end, the bottom of said trough having a forward surface adjacent the discharge end and an intermediate surface rearwardly thereof, said surfaces being angularly disposed, said draft and conveying means being adapted to follow the general plane of said intermediate surface as it passes over the forward surface, said forward surface diverging from the plane of said intermediate surface and from the path of travel of said draft and conveying means whereby the distance therebetween is progressively increased toward said shaft, said forward surface extending approximately to said shaft and being intersected by said sprocket thereby providing material supporting surfaces on each side of said sprocket, the plane of said forward surface passing above the axis of rotation of said shaft.

15. In a conveyor, the combination with a trough having side walls, a material discharge end, and a bottom forming a material supporting surface, of a shaft mounted on the discharge end of said trough and extending between the side walls thereof, a sprocket carried on said shaft intermediate said side walls, draft and conveying means carried on said sprocket adapted to move material longitudinally of said trough, said shaft being adapted to drive said draft and conveying means to convey material to said discharge end, the bottom of said trough having a forward surface adjacent the discharge end and an intermediate surface rearwardly thereof, said surfaces being angularly disposed, said draft and conveying means being adapted to follow the general plane of said intermediate surface as it passes over the forward surface, said forward surface diverging from the plane of said intermediate surface and from the path of travel of said draft and conveying means whereby the distance therebetween is progressively increased toward said shaft, said forward surface extending to a position adjacent each side of said sprocket, the plane of said forward surface passing above the axis of rotation of said shaft.

16. In a conveyor, the combination with a trough having side walls, a material discharge end, and a bottom forming a material supporting surface, of a shaft mounted on the discharge end of said trough and extending between the side walls thereof, a sprocket carried on said shaft intermediate said side walls, draft and conveying means carried on said sprocket adapted to move material longitudinally of said trough, said shaft being adapted to drive said draft and conveying means to convey material to said discharge end, the bottom of said trough having a forward surface adjacent the discharge end and an intermediate surface rearwardly thereof, said surfaces being angularly disposed, said draft and conveying means being adapted to follow the general plane of said intermediate surface as it passes over the forward surface, said forward surface diverging from the plane of said intermediate surface and from the path of travel of said draft and conveying means whereby the distance therebetween is progressively increased toward said shaft, said forward surface extending to said shaft and thereby providing material supporting surfaces on each side of said sprocket, the plane of said forward surface passing above the axis of rotation of said shaft.

17. In a conveyor, the combination with a trough having a material discharge end, said trough having a discharge section adjacent the forward end that diverges from the longitudinal axis of the adjoining section of the trough, said discharge section terminating with the discharge end, of material conveying means including chain and flight means adapted to move material longitudinally along said trough, said material conveying means diverging from said discharge section to provide a clearance between said conveying means and said discharge section but maintaining sufficiently close relation therewith to move the material directly under the influence thereof until it is discharged over the discharge end of said trough.

18. In a conveyor, the combination with a trough having a material discharge end, said trough having a discharge section adjacent the forward end that diverges from the longitudinal axis of the adjoining section of the trough, said discharge section terminating with the discharge end, of material conveying means adapted to move material longitudinally along said trough, said material conveying means diverging from said discharge section to provide a clearance between said conveying means and said discharge section but maintaining sufficiently close relation therewith to move the material directly under the influence thereof until it is discharged over the discharge end of said trough.

EDWIN B. GELLATLY.